March 4, 1952  J. P. BOSK  2,587,688
COLLAPSIBLE CHILD'S CARRIER AND SEAT
Filed Nov. 28, 1947  4 Sheets-Sheet 1
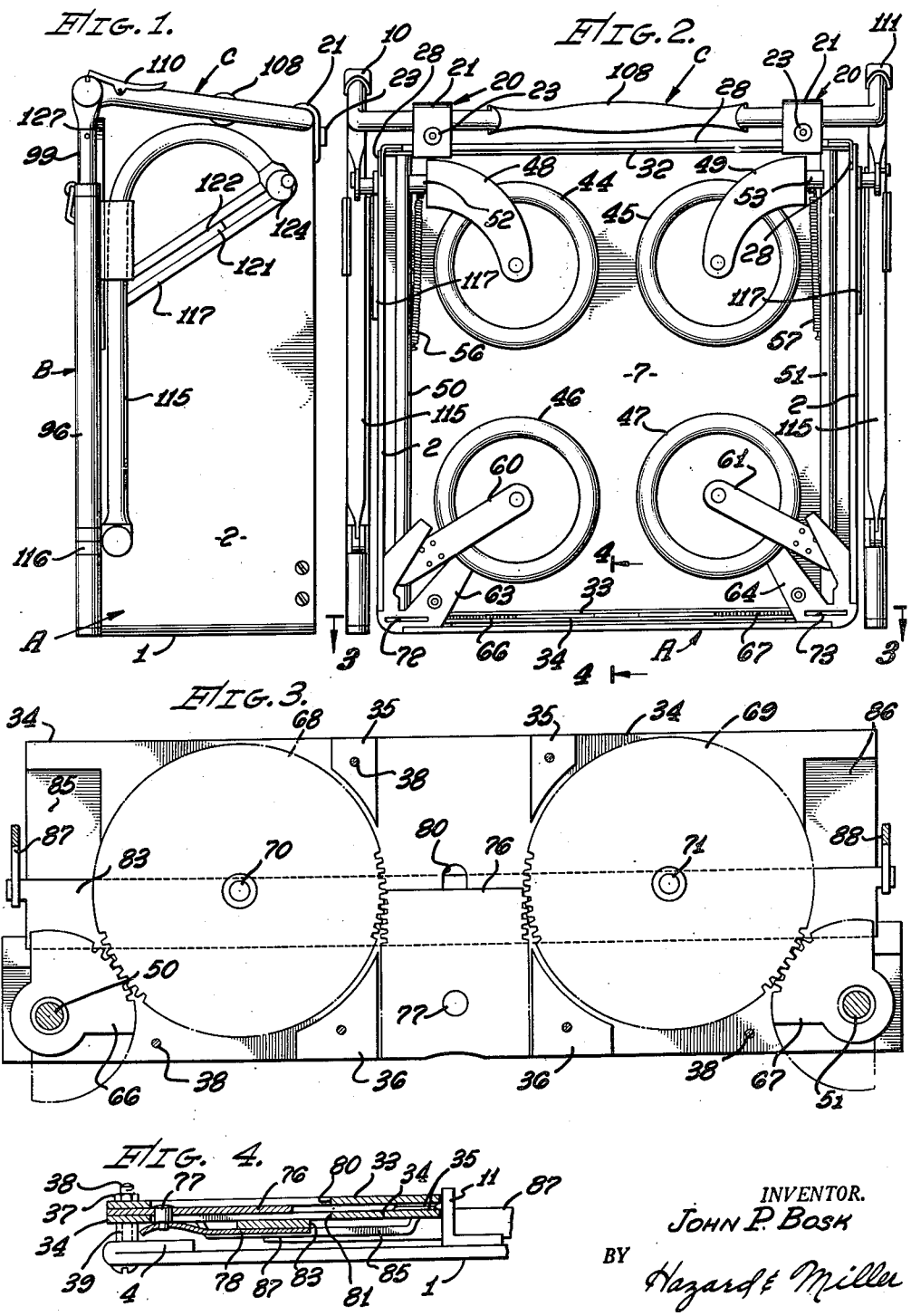
INVENTOR.
JOHN P. BOSK
BY Hazard & Miller
ATTORNEYS.

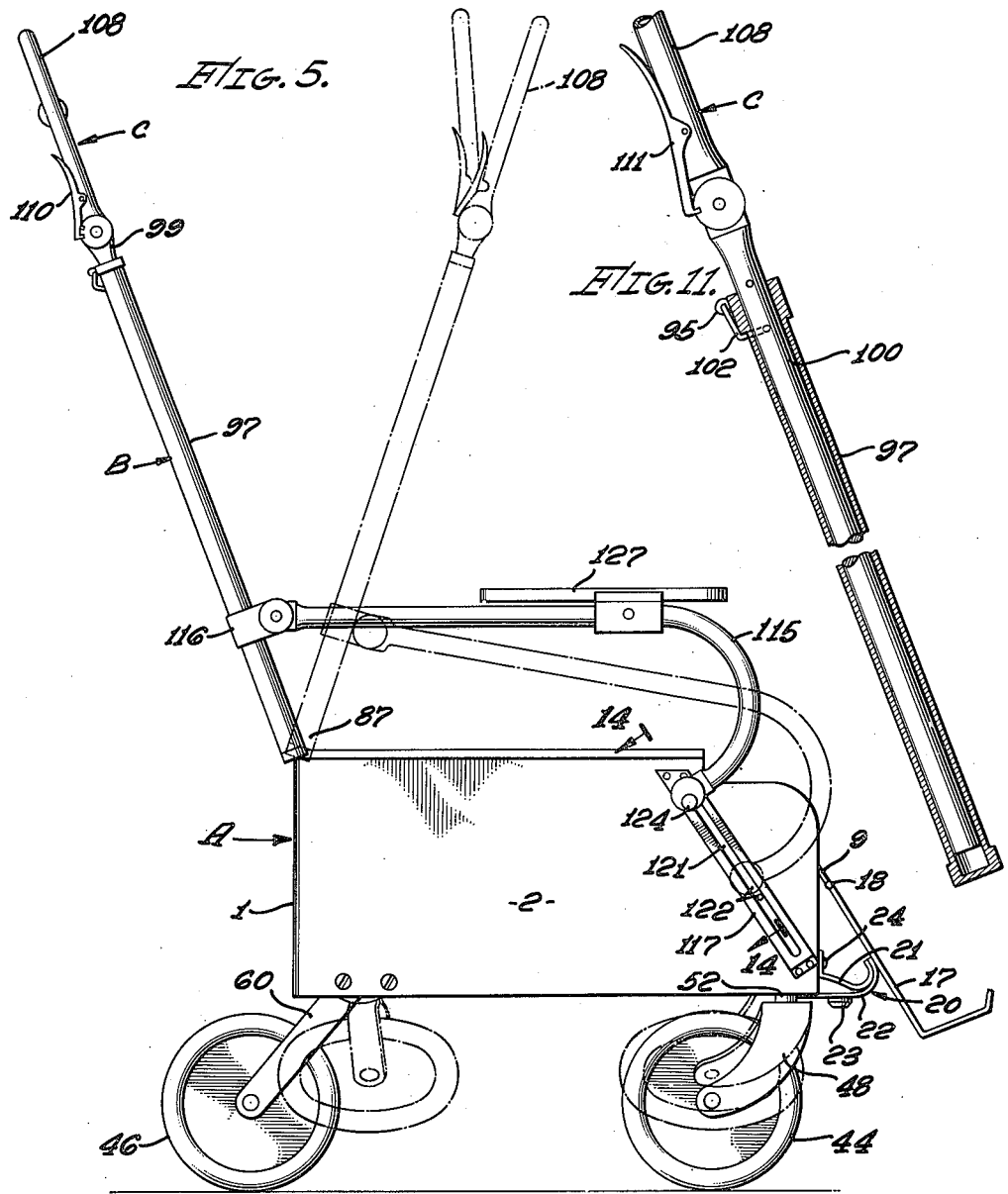

March 4, 1952  J. P. BOSK  2,587,688
COLLAPSIBLE CHILD'S CARRIER AND SEAT
Filed Nov. 28, 1947  4 Sheets-Sheet 3
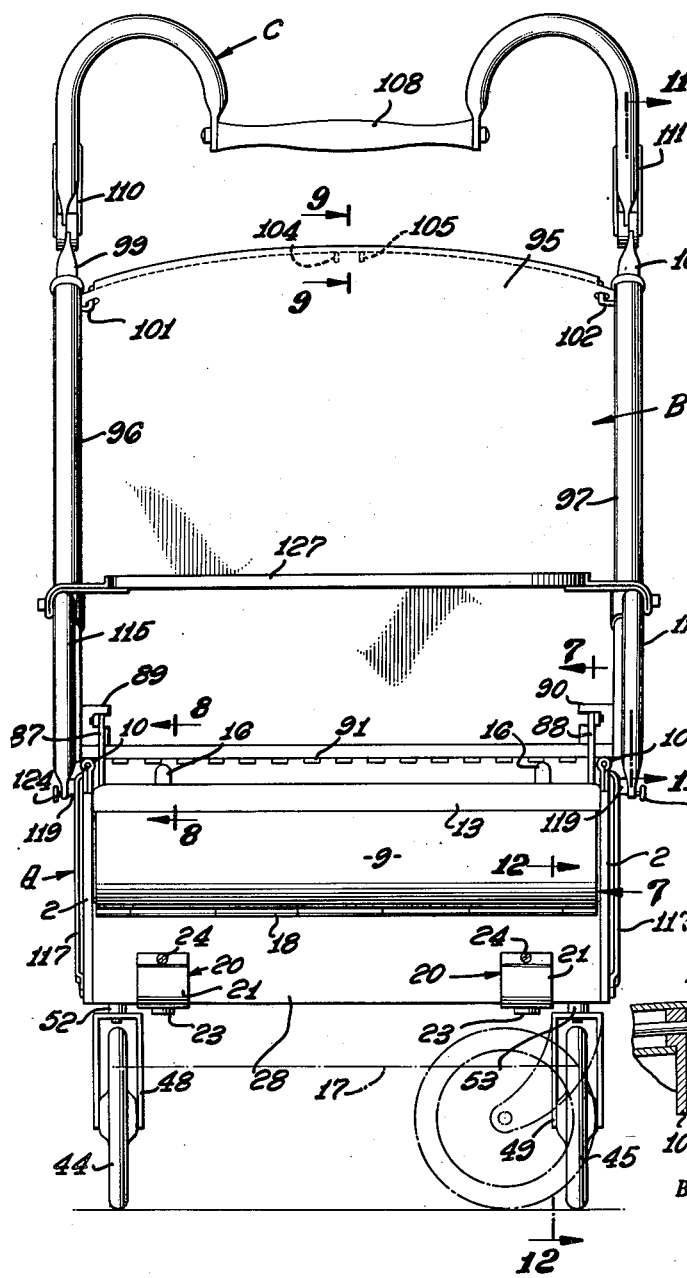
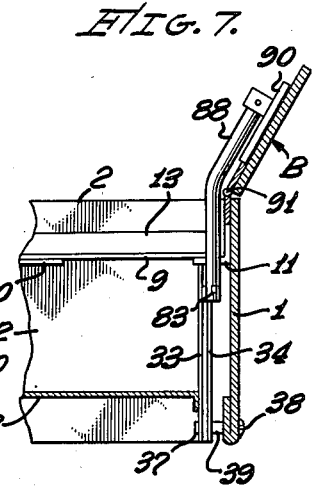
INVENTOR.
JOHN P. BOSK
BY
Hazard & Miller
ATTORNEYS.

March 4, 1952        J. P. BOSK        2,587,688
COLLAPSIBLE CHILD'S CARRIER AND SEAT
Filed Nov. 28, 1947        4 Sheets-Sheet 4
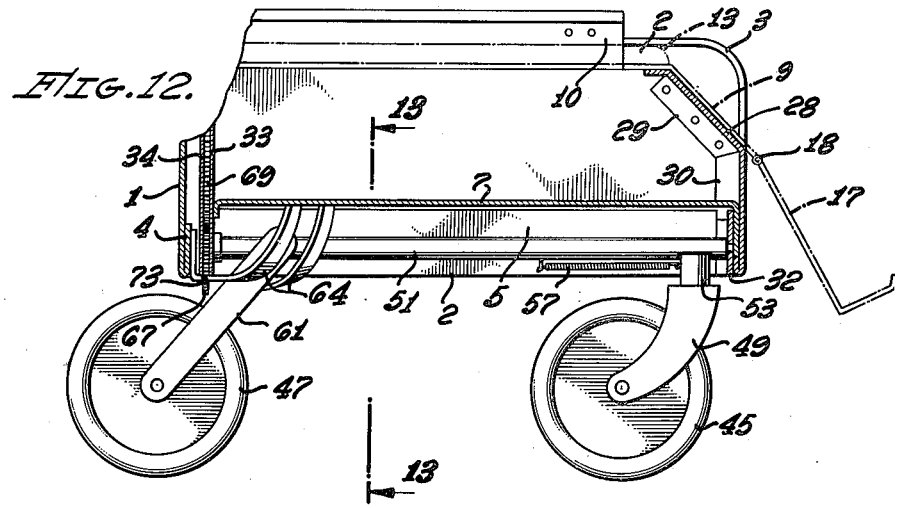
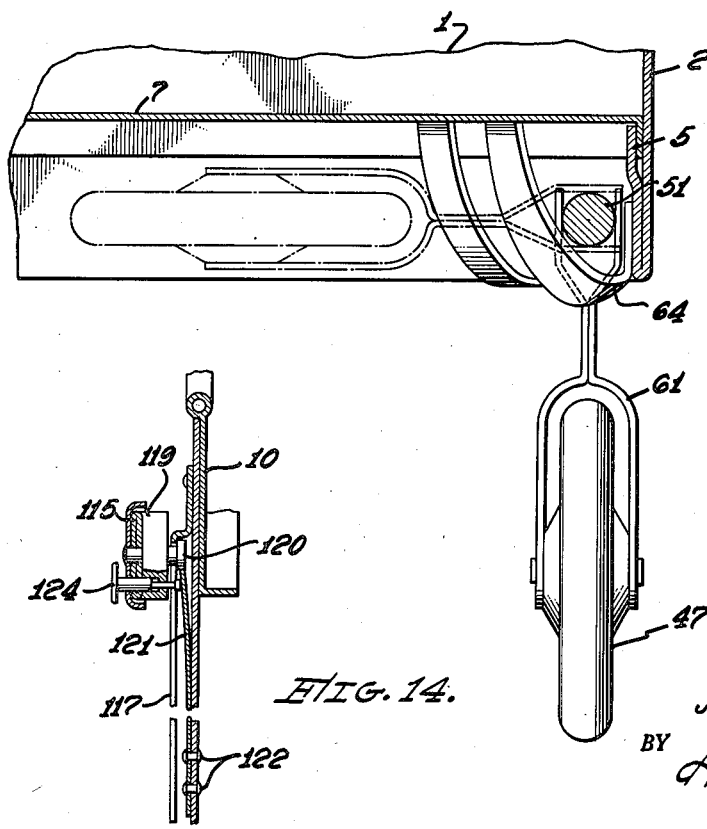
INVENTOR.
JOHN P. BOSK
BY Hazard & Miller
ATTORNEYS.

Patented Mar. 4, 1952

2,587,688

UNITED STATES PATENT OFFICE 2,587,688

COLLAPSIBLE CHILD'S CARRIER AND SEAT

John P. Bosk, Los Angeles, Calif.

Application November 28, 1947, Serial No. 788,584

9 Claims. (Cl. 280—39)

This invention relates to a collapsible carrier for small children or infants and in particular to a collapsible carrier which is so constructed that it may be more easily and quickly collapsed than prior devices.

This application is copending with my application, Serial No. 670,665, filed May 18, 1946 now Patent No. 2,549,958, April 24, 1951 and forms an improvement on the collapsible infant carrier disclosed in that application.

An object of this invention is to provide an improved infant carrier that is readily collapsible into a relatively small compact and conveniently-sized article that can be transported, and upon reaching the destination can readily be set up to provide a wheeled body having a seat on which a child or infant may be positioned, the body having upstanding sides and a back rest connected thereto the back rest being equipped with a handle by which the wheeled body may be propelled.

A main object of this invention is to provide an infant carrier as described above in which the wheels are so mounted on the body of the carrier and associated with the back rest that when the back rest is folded down on the body of the carrier, the wheels are moved up into a recess provided in the body.

Another object of this invention is to provide a collapsible infant carrier supported by wheels which are so associated with the infant carrier body that when the infant carrier is set up for use, some of the wheels are positioned behind the infant carrier body thereby obtaining greater stability for the carriage as a whole, and providing means for connecting the wheels to the back rest of the infant carrier whereby when the back rest is folded down on the carrier body, the wheels are moved up into a recess provided in the carrier body.

With the foregoing and other objects in view, which will be made manifest in the following detailed description and specifically pointed out in the appended claims, reference is had to the accompanying drawings for an illustrative embodiment of the invention, wherein:

Fig. 1 is a view in end elevation of the improved infant carrier in its fully collapsed position;

Fig. 2 is a bottom view of the improved child carrier in its fully collapsed position;

Fig. 3 is an enlarged sectional view along lines 3—3 of Fig. 2;

Fig. 4 is an enlarged sectional view along lines 4—4 of Fig. 2;

Fig. 5 is a side elevation view of the improved infant carrier showing the carrier in its set-up condition in full lines and in partial closed position in dot-dash lines;

Fig. 6 is a front elevation view of the improved infant carrier shown in full lines and illustrating in dot-dash one front wheel in a rotated position;

Fig. 7 is a sectional view along lines 7—7 of Fig. 6 in the direction of the arrows;

Fig. 8 is an enlarged sectional view along lines 8—8 of Fig. 6 in the direction of the arrows;

Fig. 9 is an enlarged sectional view along lines 9—9 of Fig. 6 in the direction of the arrows;

Fig. 10 is a sectional view along lines 10—10 of Fig. 9 in the direction of the arrows;

Fig. 11 is an enlarged sectional view along lines 11—11 of Fig. 6;

Fig. 12 is a sectional view along lines 12—12 of Fig. 6 showing the method of mounting the infant carrier wheels in full lines and the seat construction in dot-dash lines;

Fig. 13 is an enlarged sectional view along lines 13—13 of Fig. 12 showing in full lines a rear wheel in set-up condition and in dot-dash lines the wheel in collapsed position; and Fig. 14 is an enlarged sectional view along lines 14—14 of Fig. 5 showing the locking mechanism for the arm rests.

Referring to the accompanying drawings wherein similar reference characters designate similar parts throughout, the improved child carrier consists of a body generally entitled A, having a channel section forming a back 1 and sides 2, said sides having their upper front portions cut away and rounded, as shown in Fig. 5, and the edges of these portions of the sides 2 are reversely bent to create reversely bent portions 3, see Fig. 12. The lower edged portions of the channel section of body A are reversely bent to form reversely bent portions 4 on back 1 and 5 on sides 2, the reversely bent portions 5 being so bent as to create a space of such thickness that the side right angle marginal flanges of a bottom 7 may fit therein and be fastened in place by welding, riveting or other suitable means to form a lower recess or cavity into which the wheels of the infant carrier are positioned when the infant carrier is in its collapsed position and an upper recess or cavity for storing various supplies such as feedings, diapers or the like.

A cover or seat 9 is mounted in body A to close the upper cavity or recess and this seat rests on side rails 10 and a rear rail 11, said rails being of angular shape, as can be seen by reference to Figs. 4 and 7. Side rails 10 are fastened to sides 2 and have their upper edges reversely bent, as shown in Figs. 6 and 14, an extent such as to meet the top edges of sides 2. Rear rail 11 is fastened to back 1, as shown in Figs. 4 and 7. Seat 9 comprises a sheet metal base having a cushion 13 mounted thereon and this base is provided with spaced perforations permitting angular tabs 15 to be fastened thereto, as shown in Fig. 8, and these tabs are provided with perforations into which secondary bent tabs 16 catch so that the cover or seat 9 is detachably connected to the carrier body and may be removed at will when it is desired to remove something from the storage compartment.

A foot and leg rest is provided for the infant carrier and is formed by bending the front margin of the sheet metal base downwardly at an obtuse angle and connecting foot rest member 17 thereto by means of pivot 18, as can be seen by reference to Figs. 5 and 12. Foot rest member 17 is bent outwardly and upwardly to form a place on which the infant may place his feet and this foot rest member is positioned at the proper place by bumpers 20, see Figs. 2 and 5. Each of the bumpers 20 is formed of an inner member 21 and an outer member 22 of resilient construction. Outer members 22 are preferably provided with rubber cushions 23 and curved, as shown in Fig. 5, and each outer member is fastened to its inner member which is also curved, said inner member being so bent that it may be fastened by means of screws 24 to a front wall 28 provided in body A. The rubber cushions 23 in conjunction with a second pair of rubber cushions mounted on the rear of body A permit the collapsed infant carrier to be placed on surfaces without marring or damaging said surfaces. The resilient bumpers also serve as clips into the concave portions of which fit a tubular handle as will be described.

The front wall 28 has a three sided angular shape and is fastened to sides 2 by means of bent tabs 29 and 30 provided on said front wall, which tabs are preferably riveted to sides 2 so as to position one side of said front wall vertically so that it abuts against the front right angle marginal flange of bottom 7, positions the middle side angularly and the other side horizontally, as best seen by the full lines in Fig. 12. The bottom edge of the vertical portion of front wall 28 is reversely bent, as shown in Fig. 12, and a front supporting plate 32 is provided within the lower recess of body A, and this plate and right angle marginal flange of bottom 7 and the vertical portion of front wall 28 are fastened together by riveting, welding or other suitable means.

Rear supporting plates 33 and 34 are provided in body A and are spaced from one another by spacing plates 35 and 36, see Fig. 3, and fastened together and to the back 1 of body A by nuts 37 and bolts 38, said bolts being provided with spacers 39 to properly space the rear supporting plates from the back 1 of body A, as best seen by reference to Figs. 2 and 4. Wheels 44, 45, 46 and 47 of identical construction are provided on body A to enable the infant carriage to be freely moved about. Wheels 44 and 45 which are the front wheels of the infant carriage are rotatably mounted in the bifurcated ends of knee braces 48 and 49 respectively, cause said knee braces to be rotatably mounted on rocker shafts 50 and 51 respectively by stub shafts 52 and 53 respectively, thereby allowing said front wheels to be freely rotated, as shown in the dot-dash lines in Fig. 6, this construction allowing the infant carriage to be easily guided. Front wheels 44 and 45 are urged to remain in the position shown in Fig. 5 by means of springs 56 and 57 said springs being attached to the stub shafts and to the rocker shafts as clearly shown in Fig. 2, this construction allowing easier manipulation of the infant carriage and also insuring that the front wheels wall always be in proper position to be folded up into the bottom recess when it is desired to collapse the infant carriage. Rear wheels 46 and 47 are rotatably mounted in the bifurcated ends of knee braces 60 and 61, said knee braces being pivoted by other bifurcated ends on the rocker shafts 50 and 51 respectively, as can best be seen by reference to Fig. 13. Each of the rocker shafts is rotatably supported in front supporting plate 32 at one end thereof and rotatably supported in rear supporting plates 33 and 34 at the other end thereof, as can best be seen by reference to Fig. 12. It will be noticed from Fig. 12 that when the rear wheels 46 and 47 are in their uncollapsed or set-up condition they are partially behind the infant carriage body A, such construction insuring greater stability to the infant carriage since by reference to Fig. 5 it can be seen that the propelling means is also back of the body A and the positioning of the rear wheels insures that no downward pressure on the handle of the infant carriage will tip it over rearwardly. The knee braces 60 and 61 for the rear wheels have guiding members 63 and 64 respectively, said guiding members being securely fastened to the sides 2 and back 1, as can be seen by reference to Figs. 5, 12 and 13. Each of the guiding members is bifurcated, as seen in Fig. 2, and the two prongs are curved upwardly so as to contact bottom 7 and straddle its respective knee brace. The guiding members are so designed and positioned on body A that they constrain knee braces 60 and 61 to move from their recessed position, as shown in Fig. 2, downwardly and backwardly to the position shown in Fig. 12 so that this construction allows the rear wheels to be positioned rearwardly of the body A during use of the infant carriage and allowing convenient storage of the rear wheels within the lower recess so as to create a very compact unit when it is desired to collapse the infant carriage and either store it or transport it to another place.

Rocker shafts 50 and 51 are operatively connected to a back rest generally entitled B by a gear and linkage system, as best seen by comparison of Figs. 3 and 7, parts of which system are mounted between rear supporting plates 33 and 34. Quarter gears 66 and 67 are fixedly fastened on the ends of rocker shafts 50 and 51 respectively so as to be positioned between rear supporting plates 33 and 34, see Fig. 3, and mesh with spur gears 68 and 69 respectively, said spur gears being rotatably mounted on shafts 70 and 71 respectively which shafts are fixedly mounted between rear supporting plates 33 and 34. During part of the movement of the quarter gears, as shown in dot-dash lines in Fig. 3, they will be downwardly in such a position that slots 72 and 73 must be provided in guiding members 63 and 64 to allow this downward movement without contact of the guiding members, see Fig. 2. Spur gears 68 and 69 mesh with rack 76 said rack being contained between rear supporting plates 33 and 34, as shown in Fig. 4. Rack 76 is provided with a stub pin 77 securely fastened thereto, said stub pin having a reduced portion which fits within an aperture in a leaf spring 78. Rear supporting plates 33 and 34 are slotted at 80 and 81 respectively to permit stub pin 77 to reciprocate freely between said rear supporting plates. Leaf spring 78 is permanently fastened to a link bar 83, said bar being positioned on the outside of rear supporting plate 34 and contained within guides 85 and 86 which are preferably formed by slotting rear supporting plate 34 near its shorter margins and bending the margins outwardly to create guides 85 and 86, as can best be seen by reference to Figs. 3 and 4. Link bar 83 has stub portions formed on opposite ends thereof and links 87 and 88 are provided with slots to fit these stub portions, as best seen by reference to Figs. 3 and 7, said links being of angular shape with the upper ends thereof being pivotally fastened to the back rest B by means of pivot plates 89 and 90. Back rest B is pivoted by means of pivot 91 to back 1 of body A and it will be seen that when back rest B is moved from its rearward position down onto body A, links 87 and 88 will cause link bar 83 to move downwardly thereby moving rack 76 downwardly thereby rotating spur gears 68 and 69 which in turn rotate quarter gears 66 and 67 thereby rotating rocker shafts 50 and 51 so that wheels 44, 45, 46 and 47 are folded up under body A within the lower recess thereof.

Back rest B comprises a sheet metal back 95 the sides of which are reversely bent to form tubes 96 and 97, as can best be seen by reference to Figs. 6 and 11, and into these tubes the legs 99 and 100 of a handle generally entitled C slide. The legs 99 and 100 of handle C are preferably formed of tubular metal and have perforations at spaced intervals so that the handle may be located in several different positions with the aid of a locking mechanism which fits within the perforations in the legs. The locking mechanism is housed within the reversely bent top portion of the sheet metal back 95, as can best be seen by reference to Figs. 6 and 9, and comprises rods 101 and 102 which are angularly bent at one end of each so as to protrude through slotted portions of sheet metal back 95 and through apertures provided within tubes 96 and 97 and are urged to bear against legs 99 and 100 of handle C by a spring 103 which is housed within the upper reversely bent portion of the sheet metal back 95 and surrounds two ends of rods 101 and 102, as best seen in Fig. 10. Finger holds 104 and 105 are fastened adjacent the ends of rods 101 and 102 and the reversely upper bent portion of sheet metal back 95 is slotted, as shown in Fig. 10, so that finger holds 104 and 105 abut against the separate portions of the upper reversely bent portion under the pressure of spring 103. It will be seen that when the finger holds are pressed together that rods 101 and 102 will be moved toward one another so that they will withdraw from the perforations in legs 99 and 100 permitting said legs to be moved upwardly or downwardly and the ends of rods 101 and 102 are then allowed to enter other perforations in legs 99 and 100 to position handle C in another place.

Handle C comprises legs 99 and 100 and a handlebar 108 which is pivoted to legs 99 and 100, as shown in Fig. 6. Handlebar 108 is reversely bent so that a middle portion of the handlebar is formed which is inwardly of the outmost extremities of said handlebar. Spring constraining locking clips 110 and 111 are pivoted on opposite ends of handlebar 108 and each locking clip is urged by a spring which in the case of locking clip 110 is shown in dot-dash lines in Fig. 11 so that a slot engaging portion on each of said locking clips bears against part of the pivot which connects the handlebar to legs 99 and 100, said pivot being provided with a slot or slots into which the locking clip may fit so that said handlebar may be positioned in one or several different positions this construction enabling handlebar 108 to be folded at approximately right angles to legs 99 and 100 when back rest B is folded down on body A and the reversely bent portions of handlebar 108 fit within the concave portions of bumpers 20, as best seen by reference to Fig. 1, and in this position the middle portion of handlebar 108 is approximately above the horizontal center of the collapsed carrier so that the collapsed carrier is easily carried.

Arm rests 115 are provided for the infant carriage and are pivotally mounted to back rest B on tubes 96 and 97 by means of brackets 116. These arm rests are reversely bent and the reversely bent ends are guided within guides 117, as seen in Fig. 5. There is a locking means provided on the end of each arm rest which can best be seen by reference to Fig. 14 and when the handlebar 108 is released from bumpers 20 and back rest B is moved upwardly and backwardly with respect to body A thereby causing wheels 44, 45, 46 and 47 to unfold arm rests 115 are moved up in guides 117 and the locking means is so designed that when the arm rests have reached their upmost position in the guides, said locking means locks the arm rests in the upmost position until operating a releasing means on the locking means. Guides 117 are slotted longitudinally and the ends thereof are bent angularly such that when these ends are fastened to sides 2 as by riveting or spot welding the main body of the guides will be spaced from the sides 2, as can be seen by reference to Fig. 14. Arm rests 115 are preferably of hollow tube construction and the reversely bent ends thereof are preferably pressed together, see Fig. 6, and locking spools 119 are securely fastened to the pressed ends of the arm rests. Spools 119 have a main body from which extends inwardly buttons 120 and these buttons are of greater diameter than the width of the slots in guides 117 and may be fitted through guides 117 by pressing opposite sides of the guides in opposite directions and once the buttons 120 are through the guides 117 they are securely but slidably held by said guides. The dimensions of guides 117 and buttons 120 are such that there is a space between the inner surfaces of said buttons and the sides 2 and this space is large enough so that leaf springs 121 may slide between sides 2 and the inner surfaces of said buttons. However, said leaf springs are initially so formed and fastened to sides 2 by means of rivets 122, see Fig. 5, that they press against the inner surfaces of guides 117 and therefore, as shown in Fig. 14, prevent spools 119 and buttons 120 from moving downwardly. Releasing T's 124 are mounted within bored holes in spools 119 and the ends thereof swedged to prevent said T's from falling out of spools 119 and it will be seen by reference to Fig. 14 that when the T's are pressed inwardly a sufficient distance that leaf springs 121 will be pressed down against sides 2 and under these conditions the spools 119 and buttons 120 may slide over leaf springs 121 thereby allowing arm rests 115 to slide down in guides 117 thereby allowing back rest B to be folded down on top of body A of the infant carrier.

A feeding tray 127 may be provided on arm rests 115 and may be detachably connected thereto by any suitable means such as spring constraining detents so that the feeding tray may be removed when an infant is to be placed within the carriage and then set in place and this feeding tray serves the dual purpose of preventing the infant from falling or moving out of the carriage and as a convenient place from which the infant may be fed.

The manner of collapsing and setting up the infant carrier of the present invention has been described in some detail herebefore but a short summary will be given for the fact of clarity. When the infant carriage is in the set-up condition, as shown in Fig. 5, the finger holds may be pressed together so that the handlebar 108 and legs 99 and 100 may be drawn upwardly to a convenient height to enable the infant carriage to be readily propelled and on release of the finger holds the ends of rods 101 and 102 move within perforations provided in legs 99 and 100 thereby locking the legs and handle in the extended position. The reverse operation may be performed when it is desired to collapse the infant carriage and when the finger hold releasing operation is performed the handle and legs will assume the position as shown in Fig. 5. The tees 124 of the arm rest locking mechanism are then pressed inwardly depressing leaf springs 121 and allowing the arm rests 115 to be moved down within the arm rest guides 117, allowing back rest B to be moved toward the right of the drawing, as the infant carriage is depicted in Fig. 5, and this movement of the back rest moves links 87 and 88 downwardly, thereby moving link bar 83 downwardly, rotating spur gears 68 and 69, thereby rotating rocker shafts 50 and 51 which rotation draws the front wheels 44 and 45 upwardly within the recess and causes the rear wheels to move upwardly within the recess, said rear wheels being guided by rear wheel guiding members 63 and 64 and this movement of the back rest is continued until the back rest is folded against body A, as shown in Fig. 1. Under these conditions the back rest is slightly sprung so that it has a tendency to move away from body A and it will be seen that when locking clips 110 and 111 on handlebar 108 are depressed permitting the handlebar to be pivoted downwardly enabling the reversely bent portions thereof to fit under bumpers 20 that the back rest and handle C will be held securely in their collapsed position until released therefrom by manual depression of handlebar 108 to enable said handlebar to be moved out of the bumpers. It will be seen therefore that there are locking means provided in the infant carriage to securely lock the infant carriage in its set-up condition and also locking means to lock the infant carriage in its collapsed condition.

It will be appreciated that the present invention provides a collapsible infant carrier which can be set up and collapsed with a minimum number of operations; namely, merely pressing the locking tees in and moving the back rest down on the top of body A which movement automatically causes the wheels of the infant carriage to be moved up and stored within the lower recess so that a compact unit is obtained which may be easily transported from place to place. It is also a very simple operation to set up the collapsible infant carriage which operation merely requires that the handlebar be moved out from under the bumpers and the back rest unfolded thereby automatically moving the wheels from their recessed position to their set-up position and the locking means on the arm rests are such that they automatically lock the back rest in its set-up position.

Various changes may be made in the details of construction without departing from the spirit and scope of the invention as defined by the appended claims.

I claim:

1. In a device of the class described, a body, rocker shafts mounted in said body, wheel mountings mounted on said rocker shafts, each of said wheel mountings having a wheel rotatably mounted thereon, a back rest connected to said body, arm rests connected to said back rest and slidably engaging said body, lock means so associated with said arm rests and said body that when said back rest is moved to its set-up position said lock means operates to lock said back rest in said position, and means so connecting said back rest to said rocker shafts that when said back rest is released from its set-up position rendering the locking means inoperative and moved down on said body that said rocker shafts are rotated to swing said wheels up close to the bottom of said body.

2. In a device of the class described, a body, rocker shafts extending longitudinally of the body and supported by the body for rocking movement, wheels for supporting the body, wheel mountings carrying the wheels pivotally mounted on the rocker shafts for movement through planes containing the longitudinal axes of the rocker shafts and positioning the wheels in the mentioned planes, means for causing the rocker shafts to rotate in either of two directions to bodily move the wheel mountings, and guides for guiding the wheel mountings during their bodily movement to cause the wheel mountings to optionally assume vertical positions behind the body or horizontal positions beneath the body.

3. In a device of the class described, a body, rocker shafts extending longitudinally of the body and supported by the body for rocking movement, wheels for supporting the body, wheel mountings carrying the wheels pivotally mounted on the rocker shafts for movement through planes containing the longitudinal axes of the rocker shafts and positioning the wheels in the mentioned planes, a back rest mounted for folding movement on the body, means operatively connecting the back rest and the rocker shafts responsive to folding and unfolding movements of the back rest for causing the rocker shafts to rotate in either of two directions to bodily move the wheel mountings, and guides straddling the wheel mountings for guiding the wheel mountings during their bodily movement to cause the wheel mountings to optionally assume vertical positions behind the body on horizontal positions beneath the body.

4. In a device of the class described, a body, rocker shafts extending longitudinally of the body and supported by the body for rocking movements, wheels for supporting the body pivotally connected to the rocker shafts for movement through planes containing the longitudinal axes of the rocker shafts, means for causing the rocker shafts to rotate in either of two directions to bodily move the wheels, and guides for guiding the mentioned wheels during their bodily movement to cause the wheels to optionally assume vertical upright positions behind the body or horizontal positions beneath the body.

5. In a device of the class described, a body, rocker shafts extending longitudinally of the body and supported by the body for rocking movements, wheels for supporting the body pivotally connected to the rocker shafts for movement through planes containing the longitudinal axes of the rocker shafts, a back rest mounted for folding movement on the body, means operatively connecting the back rest and the rocker shafts responsive to folding and unfolding movement of the back rest for causing the rocker shafts to rotate in either of two directions to bodily move the wheels, and guides for guiding the mentioned wheels during the bodily movement to cause the wheels to optionally assume vertical upright positions behind the body or horizontal positions beneath the body.

6. In a device of the class described, a body, rocker shafts supported from the body for rocking movement, wheels pivotally connected to the rocker shafts for supporting the body, means for causing the rocker shafts to rotate in either of two directions to bodily move the wheels, and guides for guiding the mentioned wheels during bodily movement to cause the wheels to optionally assume vertical upright positions behind the body or horizontal positions beneath the body.

7. In a device of the class described, a body, rocker shafts supported from the body for rocking movement, wheels pivotally connected to the rocker shafts for supporting the body, a back rest mounted for folding movement on the body, means operatively connecting the back rest and the rocker shafts responsive to folding and unfolding movements of the back rest for causing the rocker shafts to rotate in either of two directions to bodily move the wheels in either of two directions, and guides for guiding the mentioned wheels during their bodily movement to cause the wheels to optionally assume vertical upright positions behind the body or horizontal positions beneath the body.

8. In a device of the class described, a body having a recess in the under side thereof, wheel mountings carrying the wheels for rotation about axes transverse to the longitudinal axes of the mountings but preventing bodily movement of the wheels relative to the mountings, the wheel mountings being connected to the under side of the body for universal movement relative to the body, means for bodily moving the wheel mountings in either of two directions, and arcuate guides extending up within the recess and straddling the wheel mountings for guiding the wheel mountings during their bodily movement for causing the wheel mountings to optionally assume upright positions behind the body or horizontal positions within the recess.

9. In a device of the class described, a body, wheels for supporting the body connected to the body for universal movement relative to the body, a back rest mounted for folding movement on the body, means operatively connecting the back rest and the wheels responsive to folding and unfolding movements of the back rest for causing bodily movements of the wheels in either of two directions, and means for guiding the mentioned wheels during their bodily movement to cause the wheels to optionally assume vertical upright positions behind the body or horizontal positions beneath the body.

JOHN P. BOSK.

REFERENCES CITED

The following references are of record in the file of this patent:

UNITED STATES PATENTS

| Number | Name | Date |
|---|---|---|
| 863,972 | Ehlers | Aug. 20, 1907 |
| 938,498 | Moore | Nov. 2, 1909 |
| 1,123,908 | McGill | Jan. 5, 1915 |
| 1,135,383 | Knudsen | Apr. 13, 1915 |
| 1,140,085 | Turner | May 18, 1915 |
| 1,438,466 | Taylor | Dec. 12, 1922 |
| 1,591,681 | Pinheiro | July 6, 1926 |
| 1,599,505 | Wheatley | Sept. 14, 1926 |
| 1,653,533 | Ambler | Dec. 20, 1927 |
| 2,068,295 | Kramer | Jan. 19, 1937 |

FOREIGN PATENTS

| Number | Country | Date |
|---|---|---|
| 810,999 | France | Jan. 9, 1937 |